Jan. 24, 1928.
R. D. ST. JOHN
1,657,047
PRESSURE GAUGE
Filed Sept. 14, 1926
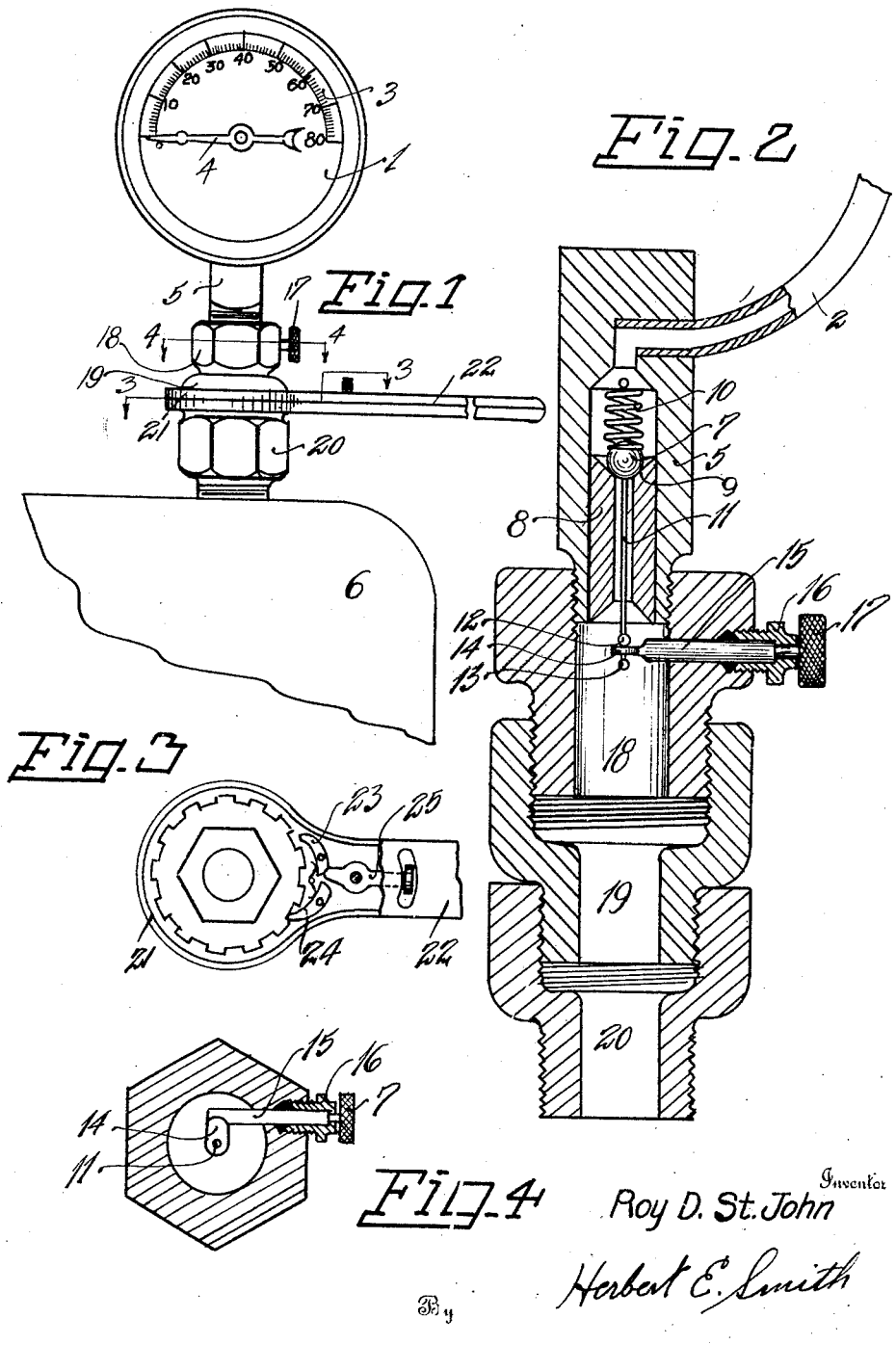
Roy D. St. John, Inventor
By Herbert E. Smith, Attorney Patented Jan. 24, 1928.

1,657,047

UNITED STATES PATENT OFFICE.

ROY D. ST. JOHN, OF SPOKANE, WASHINGTON.

PRESSURE GAUGE.

Application filed September 14, 1926. Serial No. 135,341.

My present invention relates to improvements in pressure gauges, which while applicable for use in numerous ways and for various purposes is especially adapted for measuring and indicating the compression in the cylinders of internal combustion engines.

In the utilization of the device of my invention the spark plug is removed from the engine and the gauge is applied to the spark plug opening in position to receive separate impulses from the engine and indicate and measure the compression. Means are also provided in connection with the pressure gauge for retaining the accumulated pressure in the gauge from succeeding or successive impulses of the engine to measure and indicate the maximum compression generated in the engine cylinder.

The invention consists in certain novel combinations and arrangements of parts for accomplishing the above indicated results as will hereinafter be more fully pointed out and claimed.

In the accompanying drawings I have indicated and illustrated one complete example of the physical embodiment of my invention wherein the parts are combined and arranged according to the best mode I have thus far devised for the practical application of the principles of my invention.

Figure 1 is a view in elevation showing the gauge of my invention applied for use.

Figure 2 is an enlarged vertical sectional view showing a plurality of selective attaching nipples for the device, and the check valve mechanism for retaining the pressure in the gauge.

Figure 3 is a transverse sectional view at line 3—3 of Figure 1.

Figure 4 is a transverse sectional view at line 4—4 of Figure 1.

Figure 1 of the drawings shows the general assembly and arrangement of parts, wherein a pressure gauge of the well known Bourdon type is indicated as a whole by the numeral 1. A portion of the spiral pressure tube 2 of the gauge is indicated in Figure 2, and the usual dial 3 and exterior pointer or indicator 4 are shown in Figure 1 to measure and indicate the pressure in the pressure tube.

The gauge is equipped with a specially constructed inlet pipe or tubular stem 5 to which the spiral pressure tube 2 is connected within the gauge casing, and at the lower end of the tubular stem are provided the usual exterior threads by means of which the gauge may be attached to a cylinder as 6 in Figure 1. By displacing the spark plug and threading the lower end of the tubular stem into the spark plug opening of the cylinder the gauge may be used to measure and indicate the single impulses of compression from the cylinder. As the pressure is applied to the gauge the indicator swings in usual manner to measure and indicate the degree of compression on the dial 3, and then the indicator returns to normal or zero position.

For retaining the accumulated pressure from successive impulses of compression by the piston in the cylinder, I utilize a check-valve mechanism between the cylinder and gauge, which mechanism is preferably located in the tubular stem. For this purpose I use a ball valve 7 in the tubular stem above an interior bushing 8 having a valve seat 9 at its upper end, and the coiled spring 10 located above the ball valve normally holds the latter in its seat 9. As the successive pressure impulses from the strokes of the piston in the cylinder are forced past the spring pressed check valve into the gauge the pressure in the gauge is increased therein, and the degree of compression is indicated on the dial by the indicator or hand 4.

When desired, the accumulated or maximum pressure, or the pressure from single impulses of the engine, may be released from the gauge by manually controlled means in connection with the valve stem 11 of the check valve, which stem extends downwardly from the ball valve through the bushing 8 in the tubular stem 5.

At its lower end the valve stem is provided with a pair of spaced heads 12 and 13, and a crank arm 14 on the end of a rotary pin 15 is interposed between these heads and connected to the valve stem in such manner that when the pin is turned the check valve may be lifted from its seat to release the pressure in the gauge.

The pin projects at right angles from the valve stem and is journaled to turn in a screw plug or nut 16 used as a bearing for the pin. A knurled head 17 is fixed on the exterior end of the pin for convenience in turning it.

To adapt the device for use with cylinder heads having different sizes of threaded spark plug openings, or screw threads of various pitch, I employ a plurality of interiorly threaded and exteriorly threaded nipples as 18, 19 and 20, shown in Figure 2 and threaded together for attachment to a cylinder head. As here shown the releasing pin for opening the check valve is supported or journaled in the plug 16 which is threaded in the nipple 18.

The nipple 18 as shown has an exterior threaded end of greater diameter than the nipples 19 and 20, and these latter nipples may have threads of different pitch to adapt them for spark plug holes with complementary screw threads. Nipple 20 or both nipples 20 and 19 may be disconnected from the device and threaded into the spark plug holes, as selected, if necessary.

A suitable tool may be used to apply the device to and remove it from the cylinder head, a reversible ratchet wrench being illustrated in Figures 1 and 3 for this purpose. The wrench is applied to the device before it is applied to the cylinder, and the ratchet head 21 which engages one of the nipples or nuts, is turned by means of the handle 22 extending laterally therefrom, a pair of reversing pawls or ratchets 23 and 24 being used with the head, and a shifting lever 25 is utilized for shifting the pawls in well known manner.

Having thus fully described my invention, what I claim as new and desire to secure by Letters Patent is:

The combination with a pressure gauge having a tubular attaching stem and a bushing therein having a valve seat, of a spring pressed check valve of the ball type in said seat, a valve stem, an angularly disposed release pin, and connections between said pin and stem for manually removing said valve from its seat.

In testimony whereof I affix my signature.

ROY D. ST. JOHN.